June 9, 1942. F. E. BEST 2,285,403

DYNAMIC RECTIFIER

Filed July 14, 1939

Frank Ellison Best.
INVENTOR.

Patented June 9, 1942

2,285,403

UNITED STATES PATENT OFFICE 2,285,403

DYNAMIC RECTIFIER

Frank Ellison Best, Indianapolis, Ind.

Application July 14, 1939, Serial No. 284,494

14 Claims. (Cl. 74—573)

This invention relates to means for and a method of dynamically balancing rotatable machine parts.

In my copending patent application Serial No. 169,682, filed October 18, 1937, I disclose a method and means of similar nature.

An object of this invention is to provide a rotary machine part which is dynamically balanced by rotating it for a substantial period of time at a speed at which the vibrations of the rotating machine part, due to dynamic unbalance, are dampened and substantially neutralized by the reactive vibrations of the supporting means for said machine part.

If a rotatable machine part which is dynamically unbalanced is mounted in a bearing and supporting stator means and rotated it will tend to vibrate or oscillate and the vibrations or oscillations thereof will be communicated to the bearing and supporting stator means, which have a natural period of vibration, while the period of vibration of the dynamically unbalanced rotating machine part will vary in proportion with the speed of rotation thereof. As the machine part is rotated at varying speeds the period of vibration thereof for certain speeds will be in consonance with the vibrations of the bearing support and the amplitude of the vibrations will be increased while for certain other speeds of rotation the vibrations of the rotating machine part will be in dissonance to the vibration of the bearing and support therefor and the vibrations of the rotating part will be dampened and counteracted and substantially neutralized by the vibrations of the bearing and stator support. The vibrations of the rotating part and the stator support may be likened to sound waves in that they may reinforce each other or may substantially neutralize each other, the periods at which they tend to neutralize each other being likened to the nodes in resonance. At speeds at which the vibrations of the rotating body and the support therefor oppose each other, forces are set up which produce hammering stresses between the two parts that are not manifested externally.

It is an object of this invention to utilize the hammering stresses set up by these opposing forces to deform a permanently deformable member in the rotatable machine part and bring about a permanent state of dynamic balance therein.

Another object is to provide a rotatable machine part having embodied therein, connecting the bearing and rotor elements, dynamically compensating material capable of undergoing permanent deformation to provide a shifting of the machined center relative to the rotatable machine part when the machine part carrying said material is rotated at a speed at which the vibrations due to dynamic unbalance in the rotating machine part are opposed by the vibrations set up in the supporting means.

Another object of this invention is to provide a rotatable machine part comprising two sections connected with each other by a permanently deformable pin or rod disposed coaxially of the rotatable machine part.

Another object of this invention is to provide a rotatable machine part comprising two sections connected with each other by a permanently deformable pin or rod disposed coaxially of the rotatable machine part and positioned in the plane of the stator bearing that supports the rotatable machine part thereby minimizing the binding action between two members of a rotary machine part.

Another object is to provide dynamic balancing means of this nature that may be installed in an end portion of a rotary machine part and that does not extend through said machine part.

Other objects are to provide dynamic balancing devices that are simple in construction, efficient in operation and not expensive to construct.

Other objects of the invention will be apparent from the following description and accompanying drawing.

In the accompanying drawing

Like reference numerals designate like parts throughout the several views.

Figure 1:
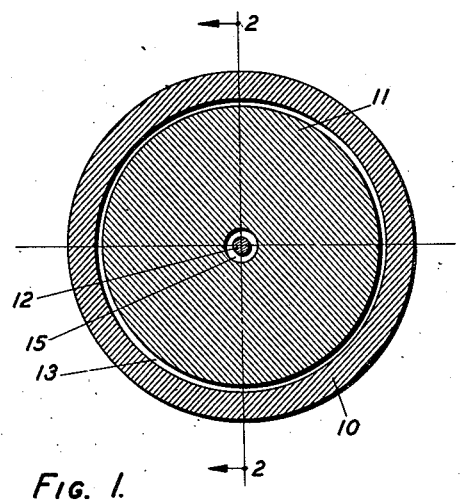
Figure 1 is a transverse sectional view, taken substantially on broken line 1—1 of Fig. 2, showing a rotary machine structure constructed in accordance with my invention.
Figure 2:
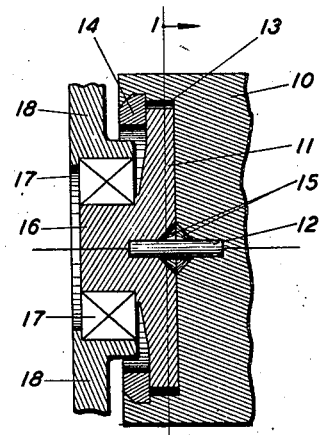
Fig. 2 is a longitudinal sectional view, taken substantially on broken line 2—2 of Fig. 1, parts being broken away.

Figs. 1 and 2 show a rotatable machine part comprising two rotatable members 10 and 11 connected with each other by a deformable pin member 12 which is positioned coaxially of the members 10 and 11. The deformable pin member 12 is made of relatively soft malleable metal such as lead, copper, soft steel or the like. This pin member 12 is capable of being deformed by hammering stresses to correct dynamic unbalance in the structure and after it has been deformed to provide a substantially correct balance it will hold its position and will not yield to any further changes as long as the dynamic balance of the structure remains correct.

The rotatable member 10 has an annular recess 13 in the end thereof and the member 11 is of smaller diameter than the annular recess 13 and is positioned within said recess 13 in face to face engagement with the member 10. Provision is thus made for some adjustment between members 10 and 11 to allow for dynamic balancing by rotation. A lock ring 14 seated in a suitable groove in the end of the member 10 is provided to hold the two members 10 and 11 in assembled relation.

The pin member 12 is coaxial with the parts 10 and 11 and is, therefore, substantially coaxial with the axis of rotation of said parts 10 and 11. The faces of the parts 10 and 11 are provided with countersunk recesses 15 around the pin 12. These recesses 15 provide clearance around the deformable pin 12 at the location where it passes between the members 10 and 11 and thereby leave, within the said recesses 15, an unsupported section of the pin 12 which is free to deform without being subjected to shearing stresses. The depth of the recesses 15 may be varied to provide clearance for any desired length of pin 12. Also satisfactory results may be obtained by recessing only one of the rotor members.

The rotatable member 11 has a coaxial bearing stud 16 thereon. The bearing stud 16 is rotatably supported in antifriction bearing members 17 in a stator bearing 18.

The bearing members 17 are preferably of the self-aligning type so to avoid dis-alignment of the shank 16 relative to said bearing members 17 when the rotor parts are brought into dynamic balance.

Figure 3:
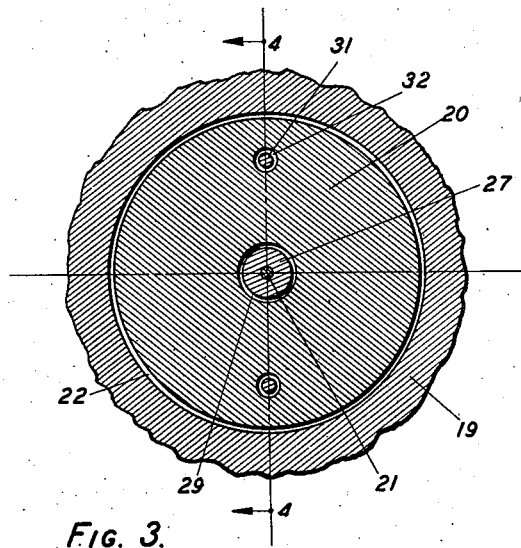
Fig. 3 is a transverse sectional view, taken substantially on broken line 3—3 of Fig. 4, showing another rotary machine structure constructed in accordance with my invention.
Figure 4:
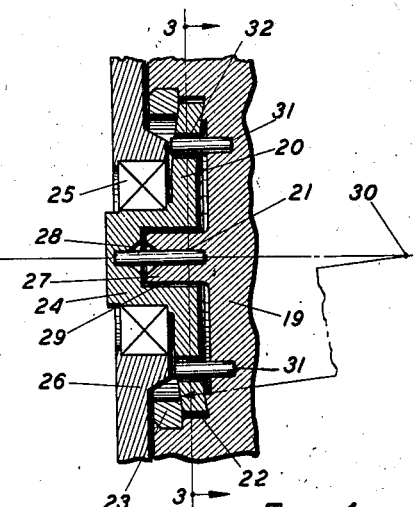
Fig. 4 is a longitudinal sectional view, taken substantially on broken line 4—4 of Fig. 3, parts being broken away.

Figs. 3 and 4 show a structure similar to that disclosed in Figs. 1 and 2 except that the deformable pin thereof is in the plane of the stator bearing. In Figs. 3 and 4 a rotatable machine part comprises two members 19 and 20 connected with each other by a coaxially disposed deformable pin 21.

The member 20 fits within a recess 22 in the end of the member 19 and is of smaller diameter than said recess 22 to provide for some adjustment between members 19 and 20 when the dynamic balancing is brought about. A lock ring 23 secures the two parts 19 and 20 in assembled relation.

The member 20 has a bearing shank 24 rotatably supported in anti-friction bearings 25 in a stator bearing 26. The bearing shank 24 has a tubular recess 29 in the side thereof adjacent the member 19 and a shank 27 on the member 19 is positioned within the recess 29. The shank 27 is of slightly smaller diameter than the recess 29 to provide for some movement and facilitate dynamically balancing the structure. The deformable pin 21 extends between this shank 27 and the end wall of the tubular bearing shank 24 and the parts 27 and 24 have recessed or countersunk portions 28 to provide clearance for a portion of the pin 21. Obviously if only one of the parts 27 or 24 has a recess 28 the device will be operative.

In the device shown in Figs. 3 and 4 the portion of the pin 21 in which the deformation takes place is positioned substantially in the medial plane of the stator bearing 25—26. This does away with substantially all leverage in the member 20, reduces to a minimum any binding tendency between the contacting surfaces of members 19 and 20 and insures that substantially all of the hammering force that is exerted as a result of dynamic unbalance will be exerted on the deformable member.

When the rotatable machine parts 11—12 of Figs. 1 and 2 or 19—20 of Figs. 3 and 4 are rotated at high speed about a horizontal or unvertical axis any dynamic unbalance present in these rotating parts will be manifested by vibrations due to the downward thrust of gravity on the rotatable part between successive revolutions.

These vibrations of the rotating parts will set up a vibration or oscillation in the bearing supporting parts, 18 of Figs. 1 and 2, or 26 of Figs. 3 and 4, which supporting parts have an unvarying period of oscillation. By varying the speed of rotation of the rotating parts it will be found that the vibrations thereof will be amplified when they are in consonance with the vibrations of the bearing and supporting parts and will be suppressed or dampened when they are in dissonance with or opposed to the vibrations of the bearing and supporting parts.

In dynamically balancing the structure the speed of the rotating parts is varied until a point is reached at which the vibrations are dampened to such an extent as to be substantially neutralized. The rotating parts are then rotated at this speed of minimum vibration for a substantial period of time. During this period the hammering forces of the opposed vibrations are exerted on the deformable pin, 12 of Figs. 1 and 2 or 21 of Figs. 3 and 4, and the deformable pin is gradually deformed by the numerous sharp blows, causing the bearing axis to gradually align itself more and more with the dynamic axis of the rotating machine part until unbalance is substantially corrected and the rotating part will thereafter run practically free from vibration at any speed.

The contacting faces of the two rotor members 19 and 20 and the contacting faces of the rotor member 20 and lock ring 23 are all preferably spherical and have a common center 30 which is the dynamic center of the rotor and is located on the axis of the member 19. If rotor member 19 is a rotating body having similar dynamic balancing means at both ends then center 30 will be substantially midway between the two ends of said rotor member 19. If only one bearing and one dynamic balancing means is provided for the rotor then the common center 30 will be the dynamic center of the rotor. Making all contacting surfaces of the parts 19, 20 and 23 spherical overcomes all tendency to twist the bearing studs out of alignment with the bearings in which they operate when the two rotor parts are relatively moved in dynamically balancing the rotor. Pins 31 rigid in rotor member 19 and extending into holes 32 of larger diameter than the pins prevent relative angular movement of rotor parts 19 and 20 and yet allow the movement required for dynamic balancing.

I have illustrated my dynamic balancing means in connection with one end portion of a rotating machine part and it will be understood that similar dynamic balancing means may be provided in connection with both ends of a rotating machine part if desired.

Having described my invention what I claim as new and desire to secure by Letters Patent is:

1. A dynamically self balancing structure comprising a two part rotor and a stator, said rotor being mounted relative to said stator by suitable bearing means, and an axially disposed permanently deformable pin connecting the two parts of said rotor.

2. A dynamically self balancing rotary structure comprising supporting and bearing means, a two part rotor rotatably supported by said supporting and bearing means, and a permanently deformable pin member connecting the two parts of said rotor and positioned substantially coaxial with the axis of rotation of said rotor.

3. A dynamically self balancing rotary structure comprising supporting and bearing means, a two part rotor rotatably supported by said supporting and bearing means, and a permanently deformable pin member connecting the two parts of said rotor and positioned substantially coaxial with the axis of rotation of said rotor, said rotor parts being shaped to provide a space around said pin member between said two rotor parts leaving a section of said pin member free to be deformed.

4. A dynamically self balancing rotary structure comprising supporting and bearing means, a two part rotor rotatably supported by said supporting and bearing means, and a permanently deformable pin member positioned in the plane of said supporting and bearing means and connecting the two parts of said rotor.

5. A dynamically self balancing rotary structure comprising supporting and bearing means, a two part rotor rotatably supported by said supporting and bearing means, and a permanently deformable pin member connecting the two parts of said rotor positioned coaxial with the axis of rotation of said rotor and in the plane of said supporting and bearing means.

6. A dynamically self balancing rotary structure comprising supporting and bearing means, a two part rotor rotatably supported by said supporting and bearing means, and a permanently deformable pin member connecting the two parts of said rotor and positioned coaxially thereof, said permanently deformable pin member being capable of being permanently deformed to provide correct dynamic balance in response to hammering stresses produced by dynamic unbalance of said rotor when said rotor is subjected to high speed rotation at a speed at which the period of vibration of the dynamically unbalanced rotor is in opposition to the natural period of vibration of the supporting and bearing means.

7. A dynamically self balancing structure comprising supporting and bearing means, a two part rotor rotatably supported by said supporting and bearing means, and a permanently deformable pin member connecting the two parts of said rotor and positioned coaxially of said rotor, said rotor parts being shaped to provide a space around a section of said permanently deformable pin member between said two rotor parts, said unsupported section of said deformable pin member being capable of permanently self adjustment to provide correct dynamic balance in response to hammering stresses produced by dynamic unbalance of said rotor when said rotor is subjected to high speed rotation at a speed at which the period of vibration of the dynamically unbalanced rotor is in opposition to the natural period of vibration of the supporting and bearing means.

8. A dynamically self balancing structure comprising a multiple part rotor member having two parts positioned in abutting relation, one of said parts having a bearing shank thereon, a deformable pin member connecting said two parts, said rotor parts being recessed to provide a space around said deformable pin member between said two parts; and a stator bearing positioned to receive and rotatably support the bearing shank on one of said rotor parts.

9. A dynamically self balancing structure comprising a multiple part rotor member having two parts positioned in abutting relation, one of said parts having a tubular bearing shank and the other part having a shank portion positioned within said tubular bearing shank, a deformable pin member positioned axially of said two shank members connecting said two rotor parts, and a stator bearing positioned to receive and rotatably support said tubular bearing shank with said deformable pin member substantially in the plane of said stator bearing.

10. In a dynamically self balancing rotary structure, a main rotor part having a spherical end surface, a second rotor part having a spherical surface positioned in abutting relation to the spherical end surface of said main rotor part, means holding said two rotor parts in assembled relation and providing for a small amount of movement between said two spherical surfaces, a deformable pin member positioned axially of said two rotor parts connecting the same, a bearing shank on said second rotor part, and a stator bearing positioned to receive and rotatably support said bearing shank, said abutting spherical surfaces providing for relative movement between said main rotor part and said second rotor part without disturbing the alignment of said bearing shank in said bearing.

11. The method of dynamically balancing a dynamically unbalanced rotatable machine part comprising rotor and bearing elements joined by an axial pin member of permanently deformable material, said method comprising the step of mounting said rotatable machine part to a supporting stator element through said bearing means said stator element having a natural period of vibration and the step of rotating said machine part about an unvertical axis, such as a horizontal axis, for a substantial period of time at a speed such that the vibrations of said machine part, due to rotation under the downward pull of gravity, are in dissonance with vibrations set up in said stator element, thus deforming the said deformable pin member by the dynamic hammering reactions taking place between the gravitational down strokes of said rotating machine part and the reactive vibration up strokes of said stator element and thus bringing into practical coincidence the axis of said bearing means with the dynamic axis of said rotor element.

12. The method of dynamically balancing a dynamically unbalanced rotatable machine part comprising rotor and bearing elements joined by an axial pin member of permanently deformable material, which comprises supporting said rotatable machine part in supporting and bearing means which is capable of vibration and deforming said deformable pin member to provide dynamic balance by rapidly rotating said machine part for a substantial period of time at a speed at which the vibration of said machine part, due to dynamic unbalance, is substantially neutralized by the vibration of the supporting and bearing means.

13. The method of providing a dynamically balanced machine part which comprises incorporating into the construction of said machine part separable rotor and bearing elements joined by an axial pin member of permanently deformable material, and then subjecting said machine part to high speed rotation in a vibratory support and bearing at a speed at which the vibration of said machine part, due to dynamic unbalance, is dampened and substantially neutralized by the vibration of the supporting and bearing means, whereby the hammering stresses set up by the opposing vibrations will deform said permanently deformable axial pin member and provide a correct dynamic balance.

14. The method of dynamically balancing a dynamically unbalanced rotatable machine part which comprises incorporating into the construction of said rotatable machine part a main rotor part having a spherical end surface, a second rotor part having a spherical surface positioned in abutting relation to the spherical end surface of said main rotor part, a permanently deformable axial pin connecting said main rotor part and said second rotor part, bearing and supporting means mounting said two rotor parts and having a natural period of vibration, said permanently deformable pin being in the plane of said bearing and supporting means, and then subjecting the said rotatable machine part to high speed rotation in said bearing and supporting means at a speed at which the vibration of said rotatable machine part, due to dynamic unbalance, is dampened and substantially neutralized by the vibration of the supporting and bearing means, whereby the hammering stresses set up by the opposing vibrations will deform said permanently deformable axial pin member and provide a correct dynamic balance.

FRANK ELLISON BEST.